United States Patent
Foutch et al.

(10) Patent No.: US 11,333,077 B2
(45) Date of Patent: May 17, 2022

(54) SYSTEMS AND METHODS FOR TRANSFERRING MECHANICAL POWER IN A TURBINE ENGINE

(71) Applicant: The Boeing Company, Chicago, IL (US)

(72) Inventors: David W. Foutch, Seattle, WA (US); Joseph M. Dirusso, Snohomish, WA (US); Kent E. Karnofski, Seattle, WA (US)

(73) Assignee: The Boeing Company, Chicago, IL (US)

(*) Notice: Subject to any disclaimer, the term of this patent is extended or adjusted under 35 U.S.C. 154(b) by 385 days.

(21) Appl. No.: 16/404,045

(22) Filed: May 6, 2019

(65) Prior Publication Data

US 2020/0355122 A1    Nov. 12, 2020

(51) Int. Cl.
*F02C 7/36* (2006.01)
*F02C 3/107* (2006.01)
(Continued)

(52) U.S. Cl.
CPC ............... *F02C 7/36* (2013.01); *B64D 31/06* (2013.01); *B64D 31/14* (2013.01); *B64D 35/02* (2013.01);
(Continued)

(58) Field of Classification Search
CPC ......... B64D 31/14; B64D 35/02; F01D 19/00; F01D 25/34; F03C 3/107; F03C 7/18; F03C 7/32; F02K 3/06; F16D 41/069
See application file for complete search history.

(56) References Cited

U.S. PATENT DOCUMENTS 3,274,768 A * 9/1966 Klein ................. F02C 7/36
  60/327
5,694,765 A * 12/1997 Hield ................. F02C 7/32
  60/39.163
(Continued)

FOREIGN PATENT DOCUMENTS

EP    1 731 735    12/2006
EP    2 320 067    5/2011
(Continued)

OTHER PUBLICATIONS

Enalou, et al. "A Preliminary Study into Turbofan Performance with LP-HP Power Exchange", Proceedings of Montreal 2018, Global Power and Propulsion Forum, May 7-9, 2018, 6 pages.
(Continued)

*Primary Examiner* — Brian P Wolcott
(74) *Attorney, Agent, or Firm* — McDonnell Boehnen Hulbert & Berghoff LLP

(57) ABSTRACT

A system (166) for transferring mechanical power in a turbine engine (150/151) including a low pressure spool (162) and a high pressure spool (156) includes a power transfer unit (168) coupled between an output shaft (172) of the low pressure spool (162) and a drive shaft (174) of the high pressure spool (156) to mechanically link the low pressure spool (162) to the high pressure spool (156), and a clutch (170) coupled to the power transfer unit (168),
(Continued)

wherein the clutch (170) is configured to transfer power produced from the low pressure spool (162) to the high pressure spool (156).

22 Claims, 7 Drawing Sheets

(51) Int. Cl.
| | |
|---|---|
| B64D 31/06 | (2006.01) |
| B64D 31/14 | (2006.01) |
| B64D 35/02 | (2006.01) |
| F01D 19/00 | (2006.01) |
| F01D 25/34 | (2006.01) |
| F02C 7/26 | (2006.01) |
| F02C 7/32 | (2006.01) |
| F02C 9/18 | (2006.01) |
| F02K 3/06 | (2006.01) |
| F16D 41/069 | (2006.01) |

(52) U.S. Cl.
CPC ............ *F01D 19/00* (2013.01); *F01D 25/34* (2013.01); *F02C 3/107* (2013.01); *F02C 7/26* (2013.01); *F02C 7/32* (2013.01); *F02C 9/18* (2013.01); *F02K 3/06* (2013.01); *F16D 41/069* (2013.01); *F05D 2220/323* (2013.01); *F05D 2260/403* (2013.01); *F05D 2260/606* (2013.01); *F05D 2260/85* (2013.01); *F05D 2270/304* (2013.01)

(56) References Cited

U.S. PATENT DOCUMENTS

| | | | | |
|---|---|---|---|---|
| 6,672,049 | B2* | 1/2004 | Franchet | F02C 7/262 60/226.1 |
| 6,895,741 | B2* | 5/2005 | Rago | F01D 15/10 60/226.1 |
| 8,039,983 | B2 | 10/2011 | Cote et al. | |
| 8,304,927 | B2 | 11/2012 | Cote et al. | |
| 8,887,485 | B2 | 11/2014 | Ress, Jr. | |
| 9,032,702 | B2* | 5/2015 | Beier | F01D 25/243 60/39.08 |
| 9,347,373 | B2* | 5/2016 | Menheere | F16H 3/72 |
| 9,353,848 | B2* | 5/2016 | Blewett | F16H 57/0424 |
| 10,718,271 | B2* | 7/2020 | Kupratis | F02C 7/32 |
| 10,823,080 | B2* | 11/2020 | Wotzak | F02C 7/275 |
| 10,850,863 | B2* | 12/2020 | Bisson | B64D 41/00 |
| 2007/0125192 | A1* | 6/2007 | Mowbray | F16H 3/10 74/336 R |

FOREIGN PATENT DOCUMENTS

| | | |
|---|---|---|
| WO | WO 95/02120 | 1/1995 |
| WO | WO 2008/082335 | 7/2008 |

OTHER PUBLICATIONS

Extended European Search Report prepared b the European Patent Office in application No. EP 20 15 9342.3 dated Sep. 18, 2020.

* cited by examiner

SYSTEMS AND METHODS FOR TRANSFERRING MECHANICAL POWER IN A TURBINE ENGINE

FIELD

The present disclosure relates generally to systems and methods for transferring mechanical power in a turbine engine, and more particularly, to transferring power from a first spool to a second spool in the turbine engine.

BACKGROUND

Modern commercial aircraft are typically driven by two or more turbofan engines. These engines include a fan that provides a significant fraction of the overall propulsion system thrust. An engine core drives the fan and produces additional thrust by directing exhaust products in an aft direction.

In addition to providing thrust to propel the aircraft, and powering the aircraft hydraulic and pneumatic systems, the turbofan engines provide electrical power to many aircraft components, including an environmental control system, aircraft computers, motor-driven hydraulic pumps, and/or other motors and electrical devices and accessories.

When the aircraft is at idle, the turbofan engines produce electrical power necessary for operation of an accessories load. But, when the turbofan engines are used to produce electrical power dictated by the accessories load, excess idle thrust may also be produced due to rotation of the fan. An engine speed (and hence fuel flow) at idle is dictated by the accessories load, and a higher load requires a higher engine speed, which causes the fan to rotate faster. An increased speed of the fan, in turn, creates the excessive thrust at idle. Any thrust at idle is generally countered by brake usage, and may result in a larger consumption of fuel than desired.

Accordingly, there is a need to reduce both idle thrust and fuel flow in these conditions.

SUMMARY

In an example, a system for transferring mechanical power in a turbine engine including a low pressure spool and a high pressure spool is described. The system comprises a power transfer unit coupled between an output shaft of the low pressure spool and a drive shaft of the high pressure spool to mechanically link the low pressure spool to the high pressure spool. In some examples, the system also includes a clutch coupled to the power transfer unit, wherein the clutch is configured to transfer power produced from the low pressure spool to the high pressure spool.

In another example, a system for transferring mechanical power in a turbine engine from a low pressure spool to a high pressure spool is described. The system comprises a power transfer unit coupled between the low pressure spool and the high pressure spool to mechanically link the low pressure spool to the high pressure spool, and a clutch that is configured to selectively couple the power transfer unit to the high pressure spool.

In another example, a method for transferring mechanical power in a turbine engine is described, wherein the turbine engine includes a low pressure spool and a high pressure spool. The method comprises coupling a power transfer unit between an output shaft of the low pressure spool and a drive shaft of the high pressure spool to mechanically link the low pressure spool to the high pressure spool.

In another example, a system for transferring mechanical power in a turbine engine including a low pressure spool and a high pressure spool is described. The system comprises a power transfer unit coupled between an output shaft of the low pressure spool and a drive shaft of the high pressure spool to mechanically link the low pressure spool to the high pressure spool, and a clutch coupled to the power transfer unit, wherein the clutch is configured to transfer power produced from the high pressure spool to the low pressure spool.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

Within examples, a system for transferring mechanical power from a low pressure spool of a gas turbine engine to a high pressure spool is described, along with methods of controlling the power transfer. The system includes a power transfer unit, which may be an engine accessory, and can be offered as options to engine manufacturers or airlines. The power transfer unit is operated to mechanically couple the low pressure spool to the high pressure spool, and the connection can be clutched out except for idle operation or other programmed operations. When engaged by the clutch, the system enables extraction of mechanical power from the low pressure spool (i.e., by slowing down a fan and low pressure turbine of the low pressure spool) and adds the mechanical power to the high pressure spool (by either increasing a speed of the high pressure spool or by allowing the engine to maintain a same speed but with less fuel flow). Example benefits of use of the system include reduced thrust at idle, and reduced fuel flow at idle.

Figure 1:
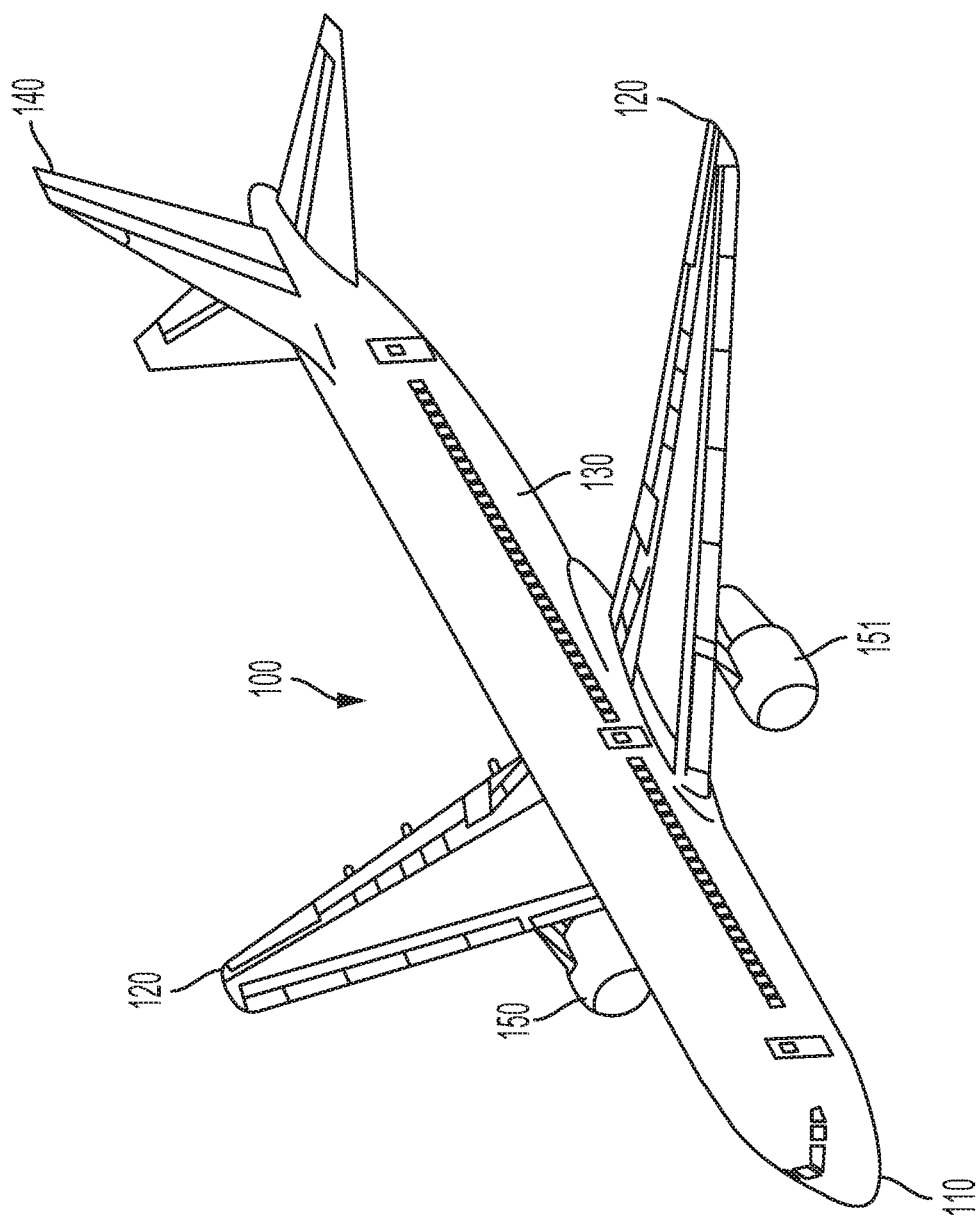
FIG. 1 shows an aircraft, according to an example implementation.

Referring now to the figures, FIG. 1 shows an aircraft 100, according to an example implementation. The aircraft 100 includes a nose 110, wings 120, a fuselage 130, a tail 140, a first turbine engine 150, and a second turbine engine 151. The second turbine engine 151 may be the same as the first turbine engine 150, for example.

Figure 2:
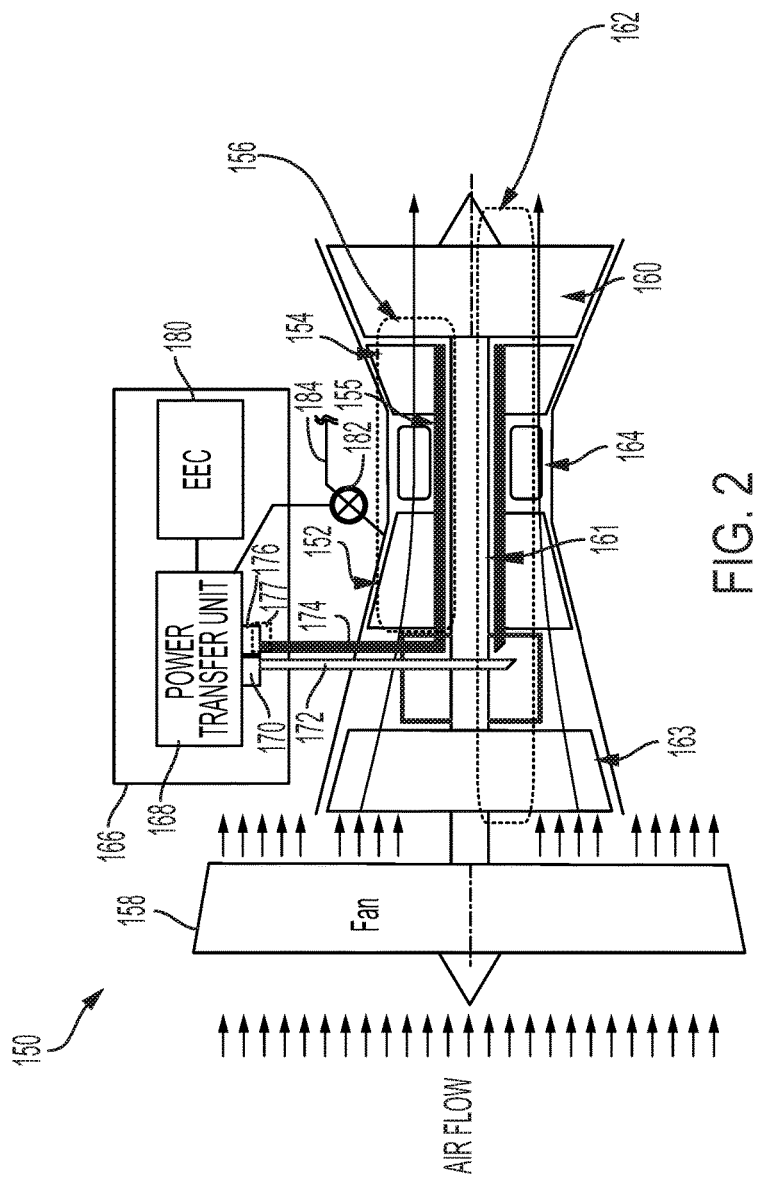
FIG. 2 is a cross-sectional, schematic view of an example of the turbine engine, according to an example implementation.

FIG. 2 is a cross-sectional, schematic view of an example turbine engine, such as the first turbine engine 150, according to an example implementation. The first turbine engine 150 includes a high pressure compressor 152 that is coupled to a high pressure turbine 154 via a first shaft 155. The high pressure compressor 152, the high pressure turbine 154, and the first shaft 155 together form a high pressure spool 156 of the first turbine engine 150. The first turbine engine 150 further includes a low pressure spool 162. The low pressure spool 162 includes a low pressure compressor 163, a low pressure turbine 160, and an associated second shaft 161 coupled between the low pressure compressor 163 and the low pressure turbine 160. The first turbine engine 150 further includes a fan 158 that is coupled to the low pressure spool 162 via the second shaft 161. The second shaft 161 is positioned annularly inwardly from the first shaft 155 so that the low pressure spool 162 and the high pressure spool 156 can rotate at different speeds. In operation, the high pressure compressor 152 compresses incoming air, which is then provided to a combustor 164. Fuel is injected into the combustor 164 wherein the fuel is mixed with the compressed air and ignited. The resultant hot exhaust products are expanded through the high pressure turbine 154 to drive the high pressure compressor 152. The exhaust gases are further expanded through the low pressure turbine 160 to drive both the low pressure compressor 163 and the fan 158. Thus, the first turbine engine 150 is arranged in a serial flow configuration in which the high pressure compressor 152 compresses airflow entering the first turbine engine 150, the combustor 164 burns a mixture of fuel and air, and the low pressure turbine 160 and the high pressure turbine 154 extract power from airflow discharged from the combustor 164 to generate thrust.

The first turbine engine 150 propels the aircraft 100, and can be operated to generate electrical power for components of the aircraft 100 when the aircraft 100 is idle on ground. It should be realized, that the second turbine engine 151 is substantially the same as the first turbine engine 150 and therefore includes the same components and operates in the same manner as described above.

As aircraft accessory power demands have increased, there has been an increased need to run the first turbine engine 150 and/or the second turbine engine 151 at idle speeds that may be higher due to the increased power demands. More specifically, increasing engine idle speed enables increased power demands to be met without sacrificing compressor stall margins. However, the increased idle speed may also generate thrust levels for the first or second turbine engines 150/151 that are higher than desired for both flight idle descent operations and/or during ground idle operations. Over time, continued operation with increased thrust levels during such idle operations may increase maintenance costs and the increased fuel flow requirements may also increase aircraft operating expenses.

FIG. 2 further illustrates a system 166 for transferring mechanical power in the first turbine engine 150 from the low pressure spool 162 to the high pressure spool 156. The system 166 includes a power transfer unit 168 and a low pressure spool output shaft 172, referred to herein as output shaft 172. The output shaft 172 is coupled between the low pressure spool 162 and the power transfer unit 168. The system 166 also includes a high pressure spool drive shaft 174, referred to herein as drive shaft 174. The drive shaft 174 is coupled between the power transfer unit 168 and the high pressure spool 156. The power transfer unit 168, the output shaft 172 and the drive shaft 174 mechanically link the low pressure spool 162 to the high pressure spool 156. The system 166 further includes a clutch 170 that is configured to selectively couple the low pressure spool 162 to the high pressure spool 156. Although the clutch 170 is shown coupled to the output shaft 172 of the low pressure spool 162, in other examples, the clutch 170 may be positioned on the other side of the power transfer unit 168 to couple to the drive shaft 174 of the high pressure spool 156.

Within examples, the clutch 170 couples the output shaft 172 of the low pressure spool 162 and the drive shaft 174 of the high pressure spool 156 to mechanically link the low pressure spool 162 to the high pressure spool 156. FIG. 2 illustrates a sprag clutch assembly 176 that enables an operator to determine if power is being transferred from the low pressure spool 162 to the high pressure spool 156. The sprag clutch assembly 176 is described in more detail below. The sprag clutch assembly 176 is optional and may not be included in all examples. Further, a torque sensor 177 could be used in place, and in the same location as, the sprag clutch assembly 176 to determine if and how much power is being transmitted by the power transfer unit 168. In FIG. 2, the torque sensor 177 is shown in dotted lines behind the sprag clutch assembly 176 to illustrate a position and placement of the torque sensor 177. In operation, the EEC 180 is configured to receive a signal from the torque sensor 177 and compare the received signal to a predetermined value. The result of the comparison then indicates whether the power transfer unit 168 is operating correctly, i.e., transferring power. In either option, the power transfer unit 168 is configured to transfer power produced from the low pressure spool 162 to the high pressure spool 156.

The power transfer unit 168 can be embodied as a transmission gearbox, a constant speed transmission, a continuously variable transmission (CVT), or an automatic transmission with a torque converter, for example. The power transfer unit 168 can have high horsepower capacity, e.g., 250 HP or 400 HP, which receives an input from the low pressure spool 162 and outputs to the high pressure spool 156 as dictated by the clutch 170. The power transfer unit 168 can modulate or control the amount of power transferred, from zero to a maximum capacity, such as e.g., 250 HP or 400 HP.

By linking motion of the low pressure spool 162 to the high pressure spool 156 with a CVT, mechanical power from excess available power on the low pressure spool 162 can be directed back into the high pressure spool 156, allowing required speed of the high pressure spool 156 to be maintained, but with reduced fuel flow. Further, extracting power from the low pressure spool 162 reduces the rotational speed of the low pressure spool 162, which in turn reduces the rotational speed the fan 158. Thus, unwanted fan thrust is reduced and the first turbine engine 150 can utilize the excess power to operate additional accessories all without increasing fuel flow. As a result, beneficially, at idle both thrust of the first turbine engine 150 and fuel flow are reduced.

The system 166 in FIG. 2 further includes an engine electronic controller (EEC) 180. The EEC 180 includes a processor for executing instructions to engage the clutch 170 and couple the power transfer unit 168 to the drive shaft 174 of the high pressure spool 156 based on a number of factors including one or any combination of a ground speed of the aircraft 100, based on receipt of a signal 181 (shown in FIG. 5) indicative of weight on wheels of the aircraft 100 (e.g., indicating that the aircraft 100 has landed), or during different stages of operation of the aircraft 100. Example stages of operation of the aircraft 100 that can trigger engagement of the clutch 170 include ground idle operation of the aircraft 100, when the aircraft 100 is taxiing, when the aircraft 100 enters takeoff mode, during descent of the aircraft 100, or during flight of the aircraft 100 to assist with restart of another turbine engine. Generally, the clutch 170 can be engaged at any time when the first turbine engine 150 is producing excess thrust that can be harvested from the low pressure spool 162 to power the high pressure spool 156 thereby reducing fuel burn while still achieving the same or increased speed of the first turbine engine 150. More details of the EEC 180 are described with reference to FIG. 5.

FIG. 2 illustrates the first turbine engine 150 with two spools (e.g., high and low). In other examples, the first turbine engine 150 may include the low pressure spool 162, the high pressure spool 156 and an intermediate pressure spool. In such examples, power may be transferred from the intermediate spool to the high pressure spool 156, or from the low pressure spool 162 to the intermediate spool.

Figure 3:
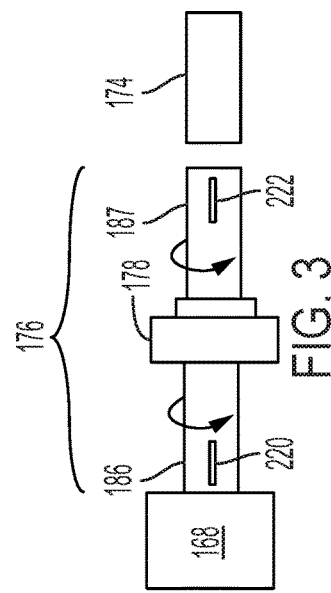
FIG. 3 illustrates a sprag clutch assembly according to an example implementation.

FIG. 3 illustrates an example of a sprag clutch assembly 176 that may be utilized to determine if power is being transferred from the low pressure spool 162 to the high pressure spool 156. As discussed above, in the illustrated embodiment, the sprag clutch assembly is coupled between the power transfer unit 168 and the high pressure spool 156 via the drive shaft 174. The sprag clutch assembly 176 includes a sprag clutch 178, a sprag clutch input shaft 186 and a sprag clutch output shaft 187. The sprag clutch input shaft 186 is coupled between the sprag clutch 178 and the power transfer unit 168. The sprag clutch output shaft 187 is coupled between the sprag clutch 178 and the high pressure spool 156 via the drive shaft 174. In the exemplary embodiment, the sprag clutch output shaft 187 may be formed unitarily with the drive shaft 174. Optionally, the sprag clutch output shaft 187 may be formed separately from the drive shaft 174 and coupled to the drive shaft 174 during assembly.

The sprag clutch assembly 176 further includes a first speed sensor 220 that is disposed on or positioned proximate to the sprag clutch input shaft 186, and a second speed sensor 222 that is disposed on or positioned proximate to the sprag clutch output shaft 187. The speed sensors 220/222 may be embodied as, for example, speed pickups mounted near the respective shafts and/or an encoder mounted directly on the shaft, for example. The outputs from the speed sensors 220 and 222 are input to the EEC 180 and processed as described below. In operation, the speed sensor 220 is operable to measure a rotational speed of the sprag clutch input shaft 186 and the speed sensor 222 is operable to measure a rotational speed of the sprag clutch output shaft 187. The difference in the individual rotational speeds measured by the speed sensors 220 and 222, respectively, is then utilized by the EEC 180 to determine if power is being transferred from the low pressure spool 162 to the high pressure spool 156.

As an example, in operation when the EEC 180 determines that the sprag clutch input shaft 186 is rotating at exactly or approximately the same speed as the sprag clutch output shaft 187, the sprag clutch 178 is engaged and power is being transferred from the low pressure spool to the high pressure spool. In other embodiments, when the EEC 180 determines that the sprag clutch input shaft 186 is rotating at a different speed than the sprag clutch output shaft 187 the sprag clutch 178 is disengaged and no power is being transferred from the LP spool to the HP spool.

In some examples, a sudden loss of horsepower addition to the high pressure spool 156 may cause the high pressure compressor 152 to surge. As an example, the surge may be caused by a shaft failure or clutch failure in the power transfer unit 168. Thus, the EEC 180 is further operable to (i) detect a decrease in power provided to the high pressure spool 156 and to (ii) cause a surge bleed valve 182 to open. In operation, the signal from the speed sensors 220 and 222, which are mounted on the sprag clutch assembly 176, are transmitted to the EEC 180. The EEC 180 can then utilize the speed sensor information to transmit a command signal to the surge bleed valve 182 causing the surge bleed valve 182 to open. The surge bleed valve 182 is coupled to a bleed discharge duct 184, which is positioned at an exit of the high pressure compressor 152. The bleed discharge duct 184 thus routes some of the excess air from the high pressure compressor 152 out through the bleed discharge duct 184 to prevent surging of the high pressure compressor 152.

Thus, the power transfer unit 168 and/or the EEC 180 is operable to detect failure of the transfer of power, and disconnect or disengage the clutch 170 resulting in normal idle thrust and fuel flow thereby having no loss of engine capability to produce thrust or to produce electrical power, hydraulic power, or bleed air for aircraft systems.

Figure 4A:
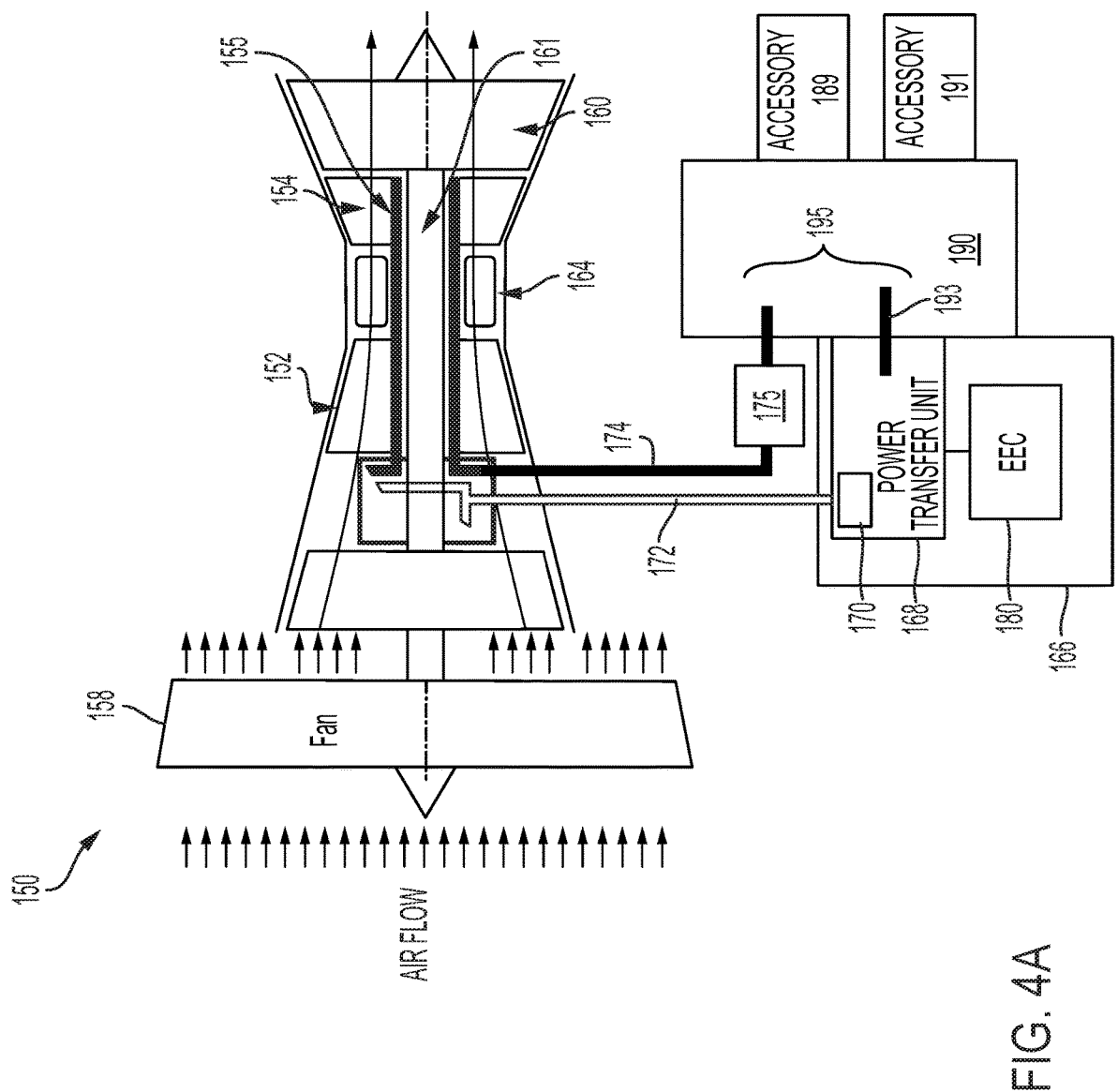
FIG. 4A is a cross-sectional, schematic view of another example of the turbine engine, according to an example implementation.

FIG. 4A is a cross-sectional, schematic view of another example of the first turbine engine 150, according to an example implementation. In FIG. 4A, the output shaft 172 of the low pressure spool 162 couples to the clutch 170, which is shown positioned internal to the power transfer unit 168. In this example, the power transfer unit 168 may incorporate functions of an angle gearbox and/or a layshaft, as necessary. The drive shaft 174 of the high pressure spool 156 couples to a 90° gearbox 175 to enable connection to an accessory gearbox 190. The 90° gearbox 175 is optional, however, as placement of the system 166 can vary. In further examples, the 90° gearbox 175 can also be used in the arrangement shown in FIG. 2.

The accessory gearbox 190 includes a drive train inside that has multiple gears to set a speed of each device attached to the accessory gearbox 190. Example accessory 189 and accessory 191 are shown coupled to the accessory gearbox 190 in FIG. 4A. The accessories may include electrical generators, hydraulic pumps, or other equipment.

In FIG. 4A, the power transfer unit 168 is shown as being configured to couple to the gear train 195 of the accessory gearbox 190 through a shaft 193. Further, the drive shaft 174 is coupled to the gear train of the accessory gearbox 190. Thus, when the clutch 170 of the power transfer unit 168 is engaged, there are two modes of power transfer. In the first mode, the power required to drive the accessories 189 and/or 191 is greater than the power supplied by the low pressure spool 162. In this mode, the additional power is supplied by the high pressure spool 156, via drive shaft 174. In the second mode, the power required to drive the accessories 189 and/or 191 is less than the power supplied by the low pressure spool 162. In this mode, the excess power from the low pressure spool 162 is transferred, via drive shaft 174, to the high pressure spool 156.

Figure 4B:
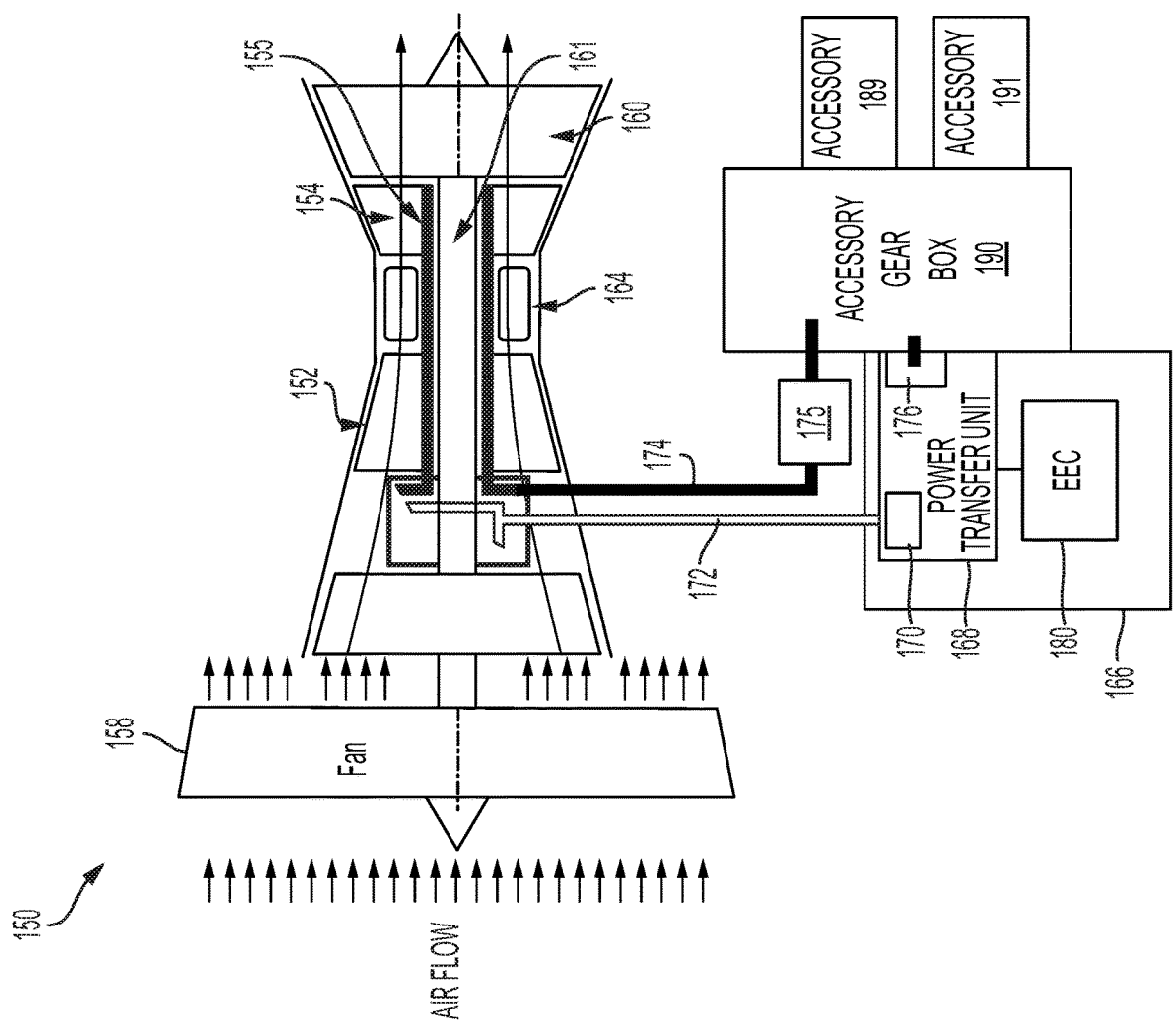
FIG. 4B is another cross-sectional, schematic view of another example of the turbine engine, according to an example implementation.

FIG. 4B is another cross-sectional, schematic view of another example of the first turbine engine 150, according to an example implementation. In FIG. 4B, the sprag clutch assembly 176 is shown internal to the power transfer unit 168 and couples to the accessory gearbox 190.

Figure 4C:
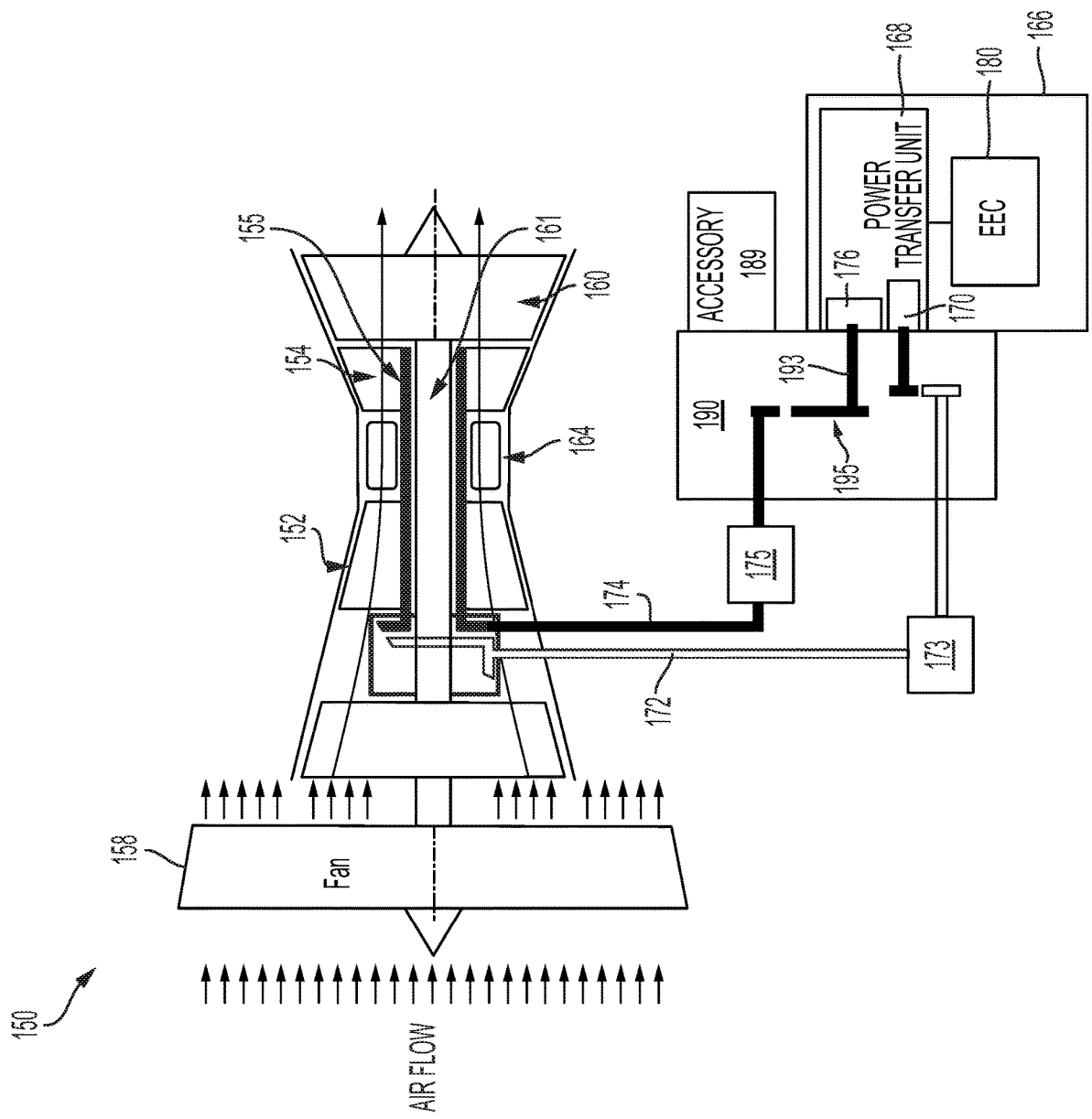
FIG. 4C is yet another cross-sectional, schematic view of another example of the turbine engine, according to an example implementation.

FIG. 4C is yet another cross-sectional, schematic view of another example of the first turbine engine 150, according to an example implementation. In FIG. 4C, the power transfer unit 168 is shown coupled to the other side of the accessory gearbox 190. In this example, the output shaft 172 of the low pressure spool 162 couples to a low pressure spool angle gearbox 173, which then connects to the accessory gearbox 190 through a shaft. The accessory gearbox 190 can include two drive trains inside with one for the high pressure spool 156 and one for the low pressure spool 162. Each drive train has one or more offtake shafts to drive the accessories mounted to the accessory gearbox 190. The gear trains set the ratio of the input speed to the speed of each offtake shaft according to the needs of the accessories.

In FIG. 4C, the power transfer unit 168 is a separate unit mounted to the accessory gearbox 190 that may be removed and replaced. The power transfer unit 168 thus has two shaft interfaces with the accessory gearbox 190, one interface for the low pressure spool portion of the accessory gearbox 190 and a separate interface for the high pressure spool portion.

Figure 5:
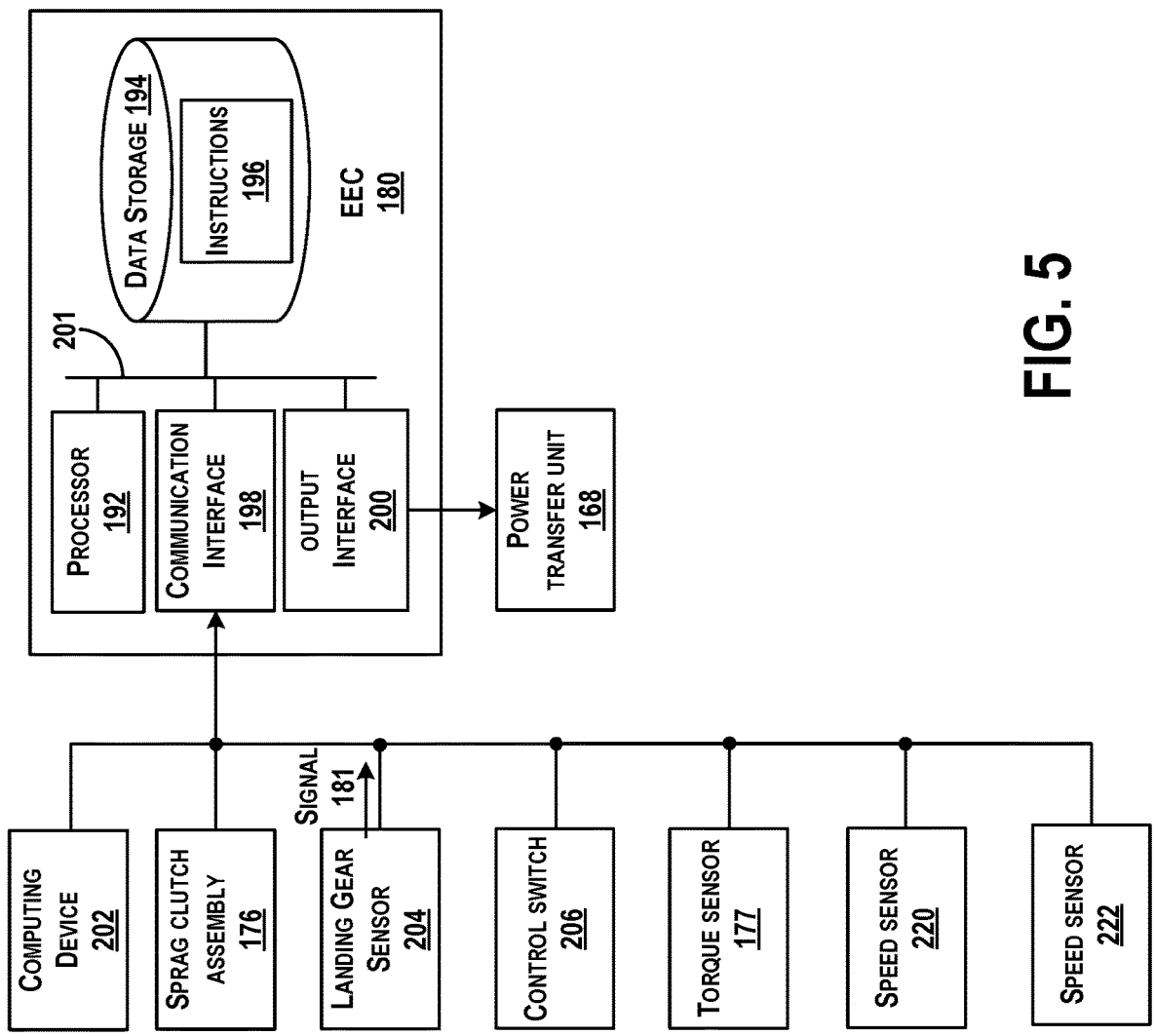
FIG. 5 illustrates a block diagram of an example of portions of the system and other components in communication with the system, according to an example implementation.

FIG. 5 illustrates a block diagram of an example of portions of the system 166 and other components in communication with the system 166, according to an example implementation. In particular, FIG. 5 illustrates the EEC 180 in communication (e.g., wired or wireless) with the power transfer unit 168. The EEC 180 may take the form of a computing device, and is shown as a stand-alone component as shown in FIG. 5. In some embodiments, the EEC 180 may be mounted directly on the first turbine engine 150 for example on the casing (not shown) of the fan 158, or another suitable location. Optionally, the EEC 180 may be mounted remotely from the first turbine engine 150 on the aircraft.

The EEC 180 includes a processor 192, and a non-transitory data storage 194 storing instructions 196, that when executed by the processor 192, causes the processor 192 to perform functions. Thus, the EEC 180 includes the processor 192 for executing instructions to engage the clutch 170 and couple the power transfer unit 168 to the drive shaft 174 of the high pressure spool 156 based on any of the factors noted above. This can include the EEC 180 sending a signal to the power transfer unit 168 causing the power transfer unit 168 to engage the clutch 170. This can further include the EEC 180 sending a second signal to the power transfer unit 168 causing the power transfer unit 168 to transfer an amount of power that varies according to the signal, the amount of power being a quantity between a minimum power value, e.g. 0 horsepower, to a maximum power value, e.g. 400 horsepower.

To perform the functions noted above, the EEC 180 includes a communication interface 198, an output interface 200, and each component of the EEC 180 is connected to a communication bus 201. The EEC 180 may also include hardware to enable communication within the EEC 180 and between the EEC 180 and other devices (not shown). The hardware may include transmitters, receivers, and antennas, for example.

The communication interface 198 may be a wireless interface and/or one or more wireline interfaces that allow for both short-range communication and long-range communication to one or more networks or to one or more remote devices. Thus, the communication interface 198 may be configured to receive input data from one or more devices, and may also be configured to send output data to other devices.

The non-transitory data storage 194 may include or take the form of memory, such as one or more computer-readable storage media that can be read or accessed by the processor 192. The computer-readable storage media can include volatile and/or non-volatile storage components, such as optical, magnetic, organic or other memory or disc storage, which can be integrated in whole or in part with the processor 192. The non-transitory data storage 194 is considered non-transitory computer readable media. In some examples, the non-transitory data storage 194 can be implemented using a single physical device (e.g., one optical, magnetic, organic or other memory or disc storage unit), while in other examples, the non-transitory data storage 194 can be implemented using two or more physical devices.

The non-transitory data storage 194 thus is a computer readable medium, and instructions 196 are stored thereon. The instructions 196 include computer executable code.

The processor 192 may be general-purpose processors or special purpose processors (e.g., digital signal processors, application specific integrated circuits, etc.). The processor 192 may receive inputs from the communication interface 198 as well as from other sensors, and process the inputs to generate outputs that are stored in the non-transitory data storage 194. The processor 192 can be configured to execute the instructions 196 (e.g., computer-readable program instructions) that are stored in the non-transitory data storage 194 and are executable to provide the functionality of the EEC 180 described herein.

The output interface 200 outputs information for reporting or storage, and thus, the output interface 200 may be similar to the communication interface 198 and can be a wireless interface (e.g., transmitter) or a wired interface as well.

FIG. 5 also includes components that provide outputs to the EEC 180. Namely, a computing device 202, the sprag clutch assembly 176 of the system 166, a landing gear sensor 204, and a control switch 206 all provide outputs to the EEC 180. In some embodiments, the clutch may be operable by the pilot via the control switch 206. In other embodiments, the operation of the clutch is automatic based on inputs to the EEC 180. More or fewer components may provide outputs to the EEC 180 as well. These outputs can be used by the EEC 180 for determining when to provide instructions to engage the clutch 170 and couple the power transfer unit 168 to the drive shaft 174 of the high pressure spool 156.

For example, the sprag clutch assembly 176 is operable to output measurements of the rotational speed of the sprag clutch output shaft 187 on the low pressure spool 162 side and the rotational speed of the sprag clutch input shaft 186 on the high pressure spool 156 side to the EEC 180. The EEC 180 can verify whether power is being transferred from the low pressure spool 162 to the high pressure spool 156 based on inputs received from the speed sensors 220 and 222. As mentioned above, based on inputs received from the speed sensors 220 and 222, the EEC 180 is operable to detect that the rotational speed of the sprag clutch output shaft 187 on the high pressure spool 156 side is less than the rotational speed of the sprag clutch input shaft 186 on the low pressure spool 162 side, and to responsively take action.

Similarly, the computing device 202 can provide outputs to the EEC 180, such as a ground speed of the aircraft 100, operational status of the aircraft 100 (e.g., ground idle operation), information indicating when the aircraft 100 is taxiing, information indicating when the aircraft 100 enters takeoff mode, information indicating that the aircraft 100 is entering a descent for landing, or other information. The EEC 180 can use any of this information from the computing device 202 to determine when to engage the clutch 170 or to activate a visual or audible signal to notify the pilot that it may be desirable to engage and/or disengage the clutch 170. The EEC 180 can be programmed to further disengage the clutch 170 if the speed of the first turbine engine 150 advances beyond a moderate threshold, or to engage the clutch 170 during descent and disengage the clutch 170 subsequently. Further options can include the EEC 180 engaging or disengaging the clutch 170 based on flap position and engine speed of the aircraft 100. Any combination or sequence of these events can be considered for determining optimal scenarios for transfer of power, and automatic control of the power transfer unit 168 by the EEC 180.

The landing gear sensor 204 can provide a signal indicative 181 of weight on wheels of the aircraft 100, indicating that the aircraft 100 has landed, to the EEC 180. Again, the EEC 180 can use this information from the landing gear sensor 204 to determine when to engage the clutch 170.

Still further, the control switch 206 is provided, which is a manual or pilot operated control switch for manual control of the clutch 170. Alternately, a control knob or other device can be used in place of the control switch.

Thus, in operation, the EEC 180 may engage or disengage the clutch 170 to vary the amount of power transferred through the power transfer unit 168. The example operations include engaging with zero power transfer, to avoid wear on the clutch 170, and then increase the power transfer to reduce idle thrust and fuel flow. The control switch 206 enables the pilot to manually engage or disengage the clutch 170. The EEC 180 may also send a signal to the power transfer unit 168 to control the amount of power transferred from the low pressure spool 162 to the high pressure spool 156.

Figure 6:
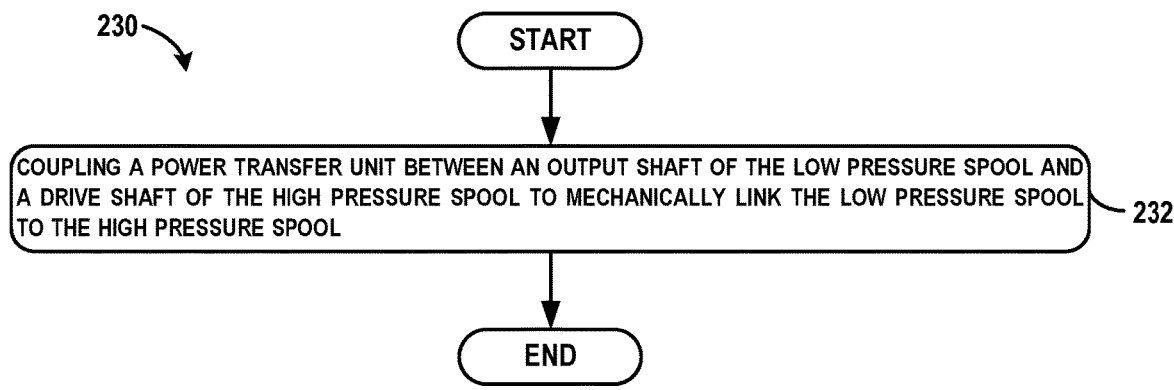
FIG. 6 is a flowchart illustrating an example of a method for transferring mechanical power in the turbine engine, according to an example implementation.

FIG. 6 is a flowchart illustrating an example of a method 230 for transferring mechanical power in the first turbine engine 150, according to an example implementation. Method 230 shown in FIG. 6 presents an example of a method that could be used with the aircraft 100 shown in FIG. 1 or with the system 166 shown in FIG. 2, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 230 may include one or more operations, functions, or actions as illustrated by one or more of blocks 232-240. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

The method 230 may be used for transferring mechanical power in the turbine engine 150/151, where the turbine engine 150/151 includes the low pressure spool 162 and the high pressure spool 156. At block 232, the method 230 includes coupling a power transfer unit between an output shaft of the low pressure spool and a drive shaft of the high pressure spool to mechanically link the low pressure spool to the high pressure spool.

Figure 7:
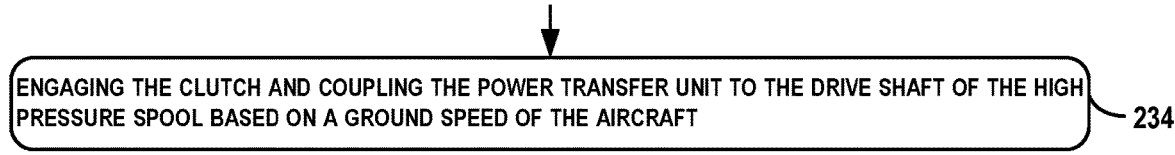
FIG. 7 shows a flowchart of an example method for use with the method of FIG. 6, according to an example implementation.

FIG. 7 shows a flowchart of an example method for use with the method 230 of FIG. 6, according to an example implementation. Specifically, when the first turbine engine 150 is included on the aircraft 100 (as opposed to being included on another vehicle type), functions include engaging the clutch 170 and coupling the power transfer unit 168 to the drive shaft 174 of the high pressure spool 156 based on a ground speed of the aircraft 100, as shown at block 234.

Figure 8:
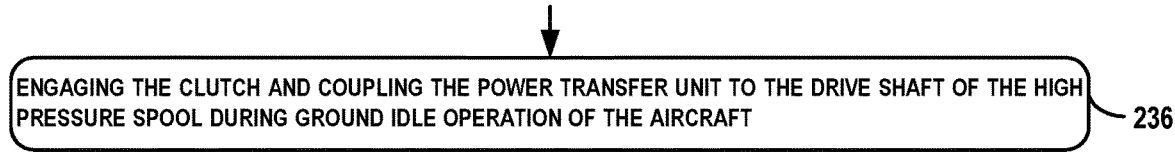
FIG. 8 shows a flowchart of another example method for use with the method of FIG. 6, according to an example implementation.

FIG. 8 shows a flowchart of another example method for use with the method 230 of FIG. 6, according to an example implementation. Specifically, when the first turbine engine 150 is included on the aircraft 100, functions include engaging the clutch 170 and coupling the power transfer unit 168 to the drive shaft 174 of the high pressure spool 156 during ground idle operation of the aircraft 100, as shown at block 236.

Figure 9:
FIG. 9 shows a flowchart of another example method for use with the method of FIG. 6, according to an example implementation.

FIG. 9 shows a flowchart of another example method for use with the method 230 of FIG. 6, according to an example implementation. Specifically, when the first turbine engine 150 is included on the aircraft 100, functions includes engaging the clutch 170 and coupling the power transfer unit 168 to the drive shaft 174 of the high pressure spool 156 during flight of the aircraft 100 to assist with restart of the first turbine engine 150, as shown at block 238. For example, in a scenario where an engine restart is needed, the system 166 can be used to transfer power to the core to improve restart conditions of the first turbine engine 150.

As another example, the system 166 can be used in no break power transfers, such as when starting an engine and needing to transfer from ground electrical power to electrical power from the engine for the aircraft 100. A full power break requires taking the aircraft 100 offline and then putting the aircraft 100 back online, which can cause a temporary disruption in power. A no break power transfer requires closely matching the frequency of the engine mounted generator with that of the ground power source. Using the system 166 enables the power transfer unit 168 to increase or decrease the engine mounted generator frequency to be that required for the no break power transfer.

Figure 10:
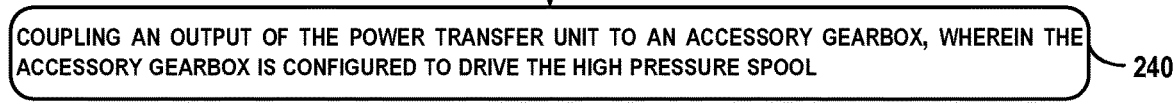
FIG. 10 shows a flowchart of another example method for use with the method of FIG. 6, according to an example implementation.

FIG. 10 shows a flowchart of another example method for use with the method 230 of FIG. 6, according to an example implementation. At block 240, functions include coupling an output of the power transfer unit 168 to the accessory gearbox 190, and the accessory gearbox 190 is configured to drive the high pressure spool 156.

Using the examples described herein, the system 166 can be provided as an accessory device to the first turbine engine 150 with mechanical drive connection to the two spools of the first turbine engine 150, such that the system 166 can transfer mechanical power between the spools. Instead of moving a load, e.g. an electrical generator, from the high pressure spool 156 to the low pressure spool 162, the system 166 enables transfer of horsepower from the low pressure spool 162 to the high pressure spool 156.

The system 166 beneficially enables a reduction in fuel consumption and engine thrust at idle conditions by transferring horsepower from the low pressure spool 162 to the high pressure spool 156. In some examples, much of the fuel burned during taxi is wasted, and it has been found that for a short range flight, taxi fuel burn is a significant fraction of mission fuel burn. In so much that the taxi operation may require thrust above the idle level, the system can stay engaged throughout the taxi operation, to prevent repeated operation of the clutch and to provide the power transfer at the above-idle thrust levels for the taxi operation. Examples have shown that using the system 166 can result in a 25% idle fuel flow reduction.

The system 166 also beneficially enables precise control of the speed of the high pressure spool 156 (e.g., so as to meet electrical frequency requirements during a no break electrical power transfer). Use of the system 166 can be selectively controlled as well, such as disconnecting the clutch 170 at climb and cruise conditions where there is little to no benefit for power transfer to potentially avoid wear on the clutch 170 and/or the power transfer unit 168 and to avoid the power losses from operating the system 166. The selective control can further be provided through manual pilot control of the system 166, and indication on a status of the power transfer can be provided in the cockpit.

Moreover, the system 166 can be used during windmilling (e.g., when the first turbine engine 150 is inoperative) to provide power to system components of the aircraft 100, such as electrical generator and hydraulic pump, by transferring power from the low pressure spool 162 to the accessory gearbox 190 via the high pressure spool 156, or via attachment of the power transfer unit 168 directly to the accessory gearbox 190.

Moreover, the system 166 can be used during in-flight idle (e.g., during decent), to reduce thrust and fuel flow.

Moreover, although the description generally describes that the transfer of power occurs via power produced by the low pressure spool 162 being transferred to the high pressure spool 156, the transfer of power can occur in the other direction, such as to transfer power produced from the high pressure spool 156 to the low pressure spool 162. Thus, the system 166 is bi-directional and can operate to transfer power in either direction. For example, there are instances where it may be advantageous to transfer power from the high pressure spool 156 to the low pressure spool 162. One instance occurs when there is a need to modulate a speed of the high pressure spool 156, such as when performing a no break electrical power transfer with variable frequency generators mounted on the high pressure gearbox. Another application occurs during cruise, where power may be transferred from the high pressure spool 156 to the low pressure spool 162 as a trim to a thermodynamic cycle of the first turbine engine 150 to improve fuel consumption. Yet another application may occur to transfer power from the high pressure spool 156 to the low pressure spool 162 as a method of decreasing a sizing point for the low pressure turbine 160. Since the high pressure turbine 154 rotates at a higher RPM than the low pressure turbine 160, a specific size and weight of the high pressure turbine 154 as a function of power is smaller. Therefore, it could be advantageous to use the power transfer unit 168 to transfer power from the high pressure spool 156 to the low pressure spool 162 during engine operating conditions that would have sized the low pressure turbine 160.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for transferring mechanical power in a turbine engine including a low pressure spool and a high pressure spool, the system comprising:
    a power transfer unit coupled to an output shaft of the low pressure spool; and an accessory gearbox including a gear train, the accessory gearbox mounted directly to the power transfer unit, the accessory gearbox coupled to a drive shaft of the high pressure spool, wherein the power transfer unit includes a shaft configured to couple an output of the power transfer unit to the accessory gearbox to transfer power from the output shaft of the low pressure spool to the gear train of the accessory gearbox, wherein the accessory gearbox is configured to drive the high pressure spool in order to mechanically link the low pressure spool to the high pressure spool.

2. The system of claim 1, further comprising a clutch coupled to the power transfer unit, wherein the clutch is configured to transfer power produced from the low pressure spool to the high pressure spool.

3. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool based on a ground speed of the aircraft.

4. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool during ground idle operation of the aircraft.

5. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool when the aircraft is taxiing.

6. The system of claim 2, wherein the turbine engine is included on an aircraft, and the system further comprises:
an engine electronic controller (EEC) including a processor for executing instructions to disengage the clutch to decouple the power transfer unit from the drive shaft of the high pressure spool when the aircraft enters takeoff mode.

7. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool during flight of the aircraft to assist with restart of the turbine engine.

8. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool based on receipt of a signal indicative of weight on wheels of the aircraft.

9. The system of claim 2, wherein the turbine engine is included on an aircraft, and the system further comprises:
an engine electronic controller (EEC) including a processor for executing instructions to engage the clutch and couple the power transfer unit to the drive shaft of the high pressure spool during descent of the aircraft.

10. The system of claim 2, further comprising:
a pilot operated control switch for manual control of the clutch.

11. The system of claim 1, wherein the power transfer unit is operable to (i) detect a decrease in power provided to the high pressure spool and to (ii) cause a surge bleed valve to open.

12. The system of claim 1, further comprising a sprag clutch assembly including a sprag clutch with a sprag clutch input shaft and an sprag clutch output shaft, where the sprag clutch input shaft is coupled to the power transfer unit and where the sprag clutch output shaft is coupled to the shaft of the power transfer unit that couples to the accessory gearbox.

13. The system of claim 12, further comprising a first speed sensor disposed proximate to the sprag clutch input shaft and a second speed sensor disposed proximate to the sprag clutch output shaft, the first speed sensor configured to measure a rotational speed of the sprag clutch input shaft and the second speed sensor configured to measure a rotational speed of the sprag clutch output shaft.

14. The system of claim 13, further comprising an engine electronic controller (EEC) including a processor for executing instructions to verify whether power is being transferred from the low pressure spool to the high pressure spool based on inputs received from the first speed sensor and the second speed sensor.

15. The system of claim 1, further comprising a torque sensor configured to sense the torque being transmitted between the low pressure spool and a drive shaft of the high pressure spool.

16. A system for transferring mechanical power in a turbine engine from a low pressure spool to a high pressure spool, the system comprising:
a power transfer unit coupled to an output shaft of the low pressure spool;
an accessory gearbox including a gear train, the accessory gearbox mounted directly to the power transfer unit, the accessory gearbox coupled to a drive shaft of the high pressure spool,
a clutch that is configured to selectively couple the power transfer unit directly to the accessory gearbox, and
wherein the power transfer unit transfers power from the output shaft of the low pressure spool to the gear train of the accessory gearbox, wherein the accessory gearbox is configured to drive the high pressure spool in order to mechanically link the low pressure spool to the high pressure spool.

17. A method for transferring mechanical power in a turbine engine, wherein the turbine engine includes a low pressure spool and a high pressure spool, the method comprising:
coupling a power transfer unit to an output shaft of the low pressure spool; and
coupling an accessory gearbox coupled to a drive shaft of the high pressure spool, wherein the accessory gearbox includes a gear train, and the accessory gearbox mounted directly to the power transfer unit,
coupling an output of the power transfer unit to the accessory gearbox to transfer power from the output shaft of the low pressure spool to the gear train of the accessory gearbox, wherein the accessory gearbox is configured to drive the high pressure spool in order to mechanically link the low pressure spool to the high pressure spool.

18. The method of claim 17 further comprising coupling, by a clutch, the power transfer unit to the accessory gearbox, wherein power produced from the low pressure spool is diverted to the high pressure spool.

19. The method of claim 18, wherein the turbine engine is included on an aircraft, and the method further comprises:
engaging the clutch and coupling the power transfer unit to the drive shaft of the high pressure spool, via the accessory gearbox, based on a ground speed of the aircraft.

20. The method of claim 18, wherein the turbine engine is included on an aircraft, and the method further comprises:
engaging the clutch and coupling the power transfer unit to the drive shaft of the high pressure spool, via the accessory gearbox, during ground idle operation of the aircraft.

21. The method of claim 18, wherein the turbine engine is included on an aircraft, and the method further comprises:
engaging the clutch and coupling the power transfer unit to the drive shaft of the high pressure spool, via the accessory gearbox, during flight of the aircraft to assist with restart of the turbine engine.

22. A system for transferring mechanical power in a turbine engine including a low pressure spool and a high pressure spool, the system comprising:
a power transfer unit coupled to an output shaft of the low pressure spool;
an accessory gearbox including a gear train, the accessory gearbox mounted directly to the power transfer unit, the accessory gearbox coupled to a drive shaft of the high pressure spool,
a clutch coupled directly between the power transfer unit and the accessory gearbox, wherein the clutch is configured to transfer power produced from the high pressure spool to the low pressure spool in order to mechanically link the low pressure spool to the high pressure spool.

* * * * *